UNITED STATES PATENT OFFICE.

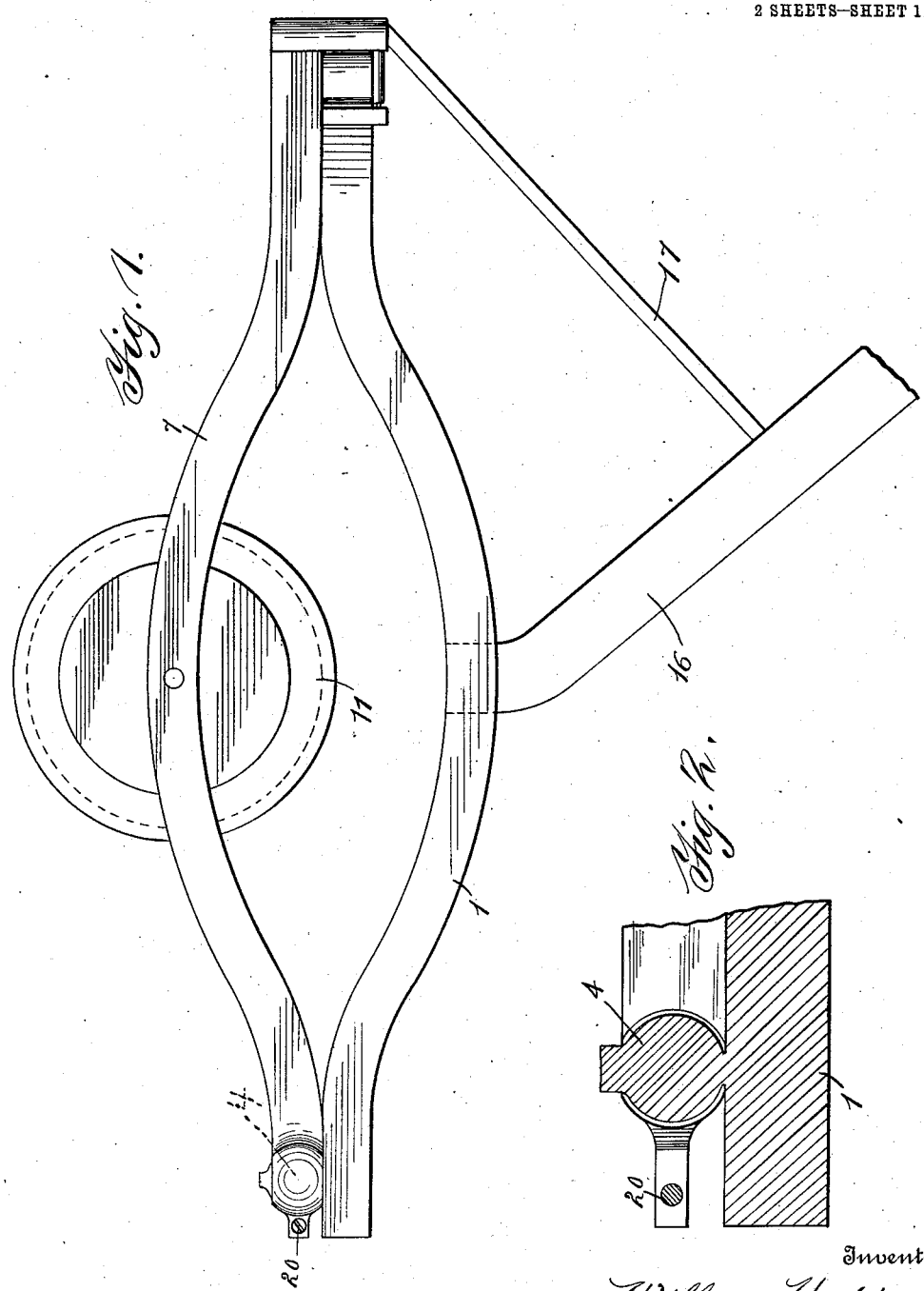

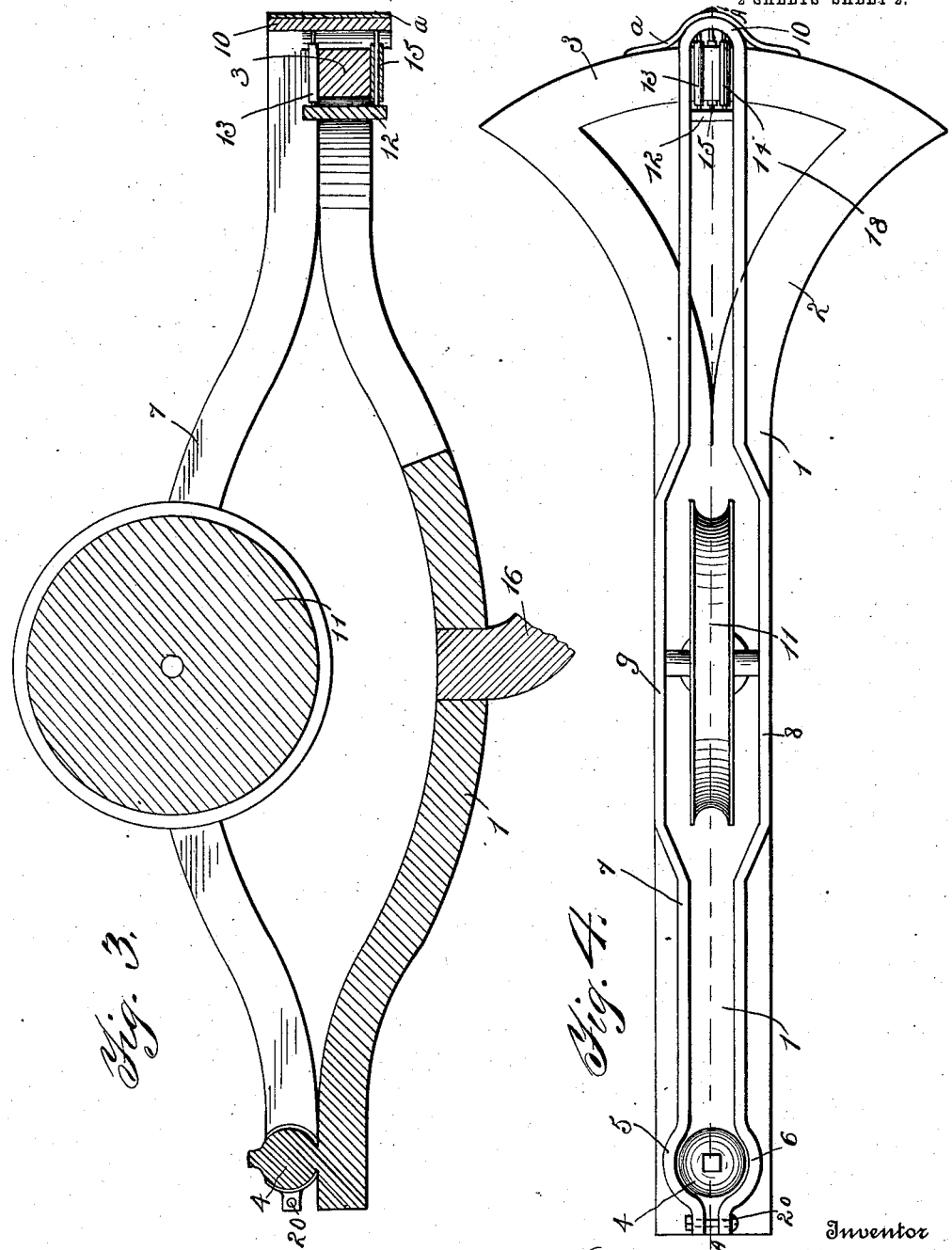

WILLIAM HADDEN, OF CRAFTON, PENNSYLVANIA.

TROLLEY-SUPPORT.

1,049,576. Specification of Letters Patent. Patented Jan. 7, 1913.

Application filed March 14, 1911. Serial No. 614,414.

*To all whom it may concern:*

Be it known that I, WILLIAM HADDEN, a citizen of the United States, residing at Crafton, in the county of Allegheny and State of Pennsylvania, have invented certain new and useful Improvements in Trolley-Supports, of which the following is a specification.

This invention relates to improvements in trolley supports and has for its object to provide a trolley support so constructed that the trolley wheel may follow any curved or zig-zagged line of wire without danger of jumping from said wire.

With the above and other objects in view I have invented the trolley harp illustrated in the accompanying drawings in which, Figure 1 is a side elevation of my improved device, Fig. 2 is an enlarged fragmental sectional view thereof, Fig. 3 is a longitudinal central sectional view taken on line A, and Fig. 4 is a top plan view of the device.

Like reference characters indicate like parts through the specification and in the several views in the drawings in which 1 is a supporting member having a flaring or pan shaped end 2 the end 3 of which forms a track the purpose of which will be later explained. Upon the rear end of the member 1 is a ball 4 around which the curved ends 5 and 6 of the member 7 form a socket. To said member 7 which is formed of a pair of parallel bars 8 and 9 integrally or fixedly connected at the forward end 10 thereof is pivoted in its center a trolley wheel 11. A member 12 is secured to the parts 8 and 9 of the member 7 and forms a bearing for one end of the rollers 13, 14 and 15, the other ends of which are journaled into the portion 10 of the member 7, the rollers 13 and 14 resting on top of the track 3 and the roller 15 abutting the under surface thereof whereby said member 7 may have lateral movement in relation to said member 1 which is fixed to a trolley pole 16 and a brace 17 connects said pole and the end 10 of said member 7. A cut away portion 18 is provided in said flared end 2 whereby said member 12 may project through to the under side of the member 1. The free ends of the member 7 are secured together by a bolt 20. Secured to the other end 10 is a spring $a$ the free ends of which are adapted to engage the edge of the part 3 to cause sufficient friction to prevent too free a movement of the members 7.

From the above description it will be readily seen that the trolley wheel 11 may follow any course a trolley wire may take without any danger whatsoever of the wheel jumping the wire. The members 1 and 7 are bent apart centerward so that they may have perfectly free movement in relation to one another said members contacting each other at their extreme ends.

I claim—

1. A trolley wheel support consisting of a pair of superimposed members bowed outwardly from each other, a wheel mounted on the upper of said members, said upper member being returned upon itself whereby the wheel is supported between said returned parts, the free ends of said upper member formed into a socket.

2. A trolley wheel support consisting of a pair of superimposed members bowed outwardly from each other, a wheel mounted on the upper of said members, said upper member being returned upon itself whereby the wheel is supported between said returned parts, the free ends of said upper member formed into a socket, the lower of said members having a ball on one of its extreme ends adapted to operate in said socket.

3. A trolley wheel support consisting of a pair of superimposed members bowed outwardly from each other, a wheel mounted on the upper of said members, said upper member being returned upon itself whereby the wheel is supported between said returned parts, the free ends of said upper member formed into a socket, the lower of said members having a ball on one of its extreme ends adapted to operate in said socket, said lower member having its other end formed fan shaped, the end thereof being formed into an arcuate track to accommodate the loose end of said upper member.

4. A trolley wheel support consisting of a pair of superimposed members bowed outwardly from each other, a wheel mounted on the upper of said members, said upper member being returned upon itself whereby the wheel is supported between said returned parts, the free ends of said upper member formed into a socket, the lower of said members having a ball on one of its extreme ends adapted to operate in said socket, said lower member having its other end formed fan shaped, the end thereof being formed into an arcuate track to accommodate the loose end of said upper member, said loose end having a roller thereon to engage said track.

5. A trolley wheel support consisting of a pair of superimposed members bowed outwardly from each other, a wheel mounted on the upper of said members, said upper member being returned upon itself whereby the wheel is supported between said returned parts, the free ends of said upper member formed into a socket, the lower of said members having a ball on one of its extreme ends adapted to operate in said socket, said lower member having its other end formed fan shaped, the end thereof being formed into an arcuate track to accommodate the loose end of said upper member, said loose end having a roller thereon to engage said track, a spring on said loose end adapted to frictionally engage the edge of said track.

6. A trolley wheel support consisting of a pair of superimposed members bowed outwardly from each other, a wheel mounted on the upper of said members, said upper member being returned upon itself whereby the wheel is supported between said returned parts, the free ends of said upper member formed into a socket, the lower of said members having a ball on one of its extreme ends adapted to operate in said socket, said lower member having its other end formed fan shaped, the end thereof being formed into an arcuate track to accommodate the loose end of said upper member, said loose end having a roller thereon to engage said track, a spring on said loose end adapted to frictionally engage the edge of said track and a trolley pole adapted to engage said lower member centrally thereof.

7. A trolley wheel support consisting of a pair of superimposed members bowed outwardly from each other, one of said members being returned upon itself, a wheel mounted between said returned parts, said wheel supporting member having its free ends formed into a socket, said other member having a ball adapted to seat in said socket.

8. A trolley wheel support consisting of a pair of superimposed members bowed outwardly from each other, one of said members being returned upon itself, a wheel mounted between said returned parts, said other member having a flaring end over which said first member is slidable, said first member having a U-shaped end and a roller mounted therein to engage said flaring end.

9. A trolley wheel support consisting of a pair of superimposed members bowed outwardly from each other, one of said members being returned upon itself, a wheel mounted between said returned parts, said other member having a flaring end over which said first member is slidable, said first member having a U-shaped end and a roller mounted therein to engage said flaring end, and a spring straddling said U-shaped end, the ends of which frictionally engage said flaring end.

In testimony whereof I affix my signature in presence of two witnesses.

WILLIAM HADDEN.

Witnesses:
ADAM H. KRESS,
JAMES S. CRAWFORD, Jr.

Copies of this patent may be obtained for five cents each, by addressing the "Commissioner of Patents, Washington, D. C."